US012621128B2

(12) United States Patent
Hillis

(10) Patent No.: US 12,621,128 B2
(45) Date of Patent: May 5, 2026

(54) SYSTEM AND METHOD FOR ESTABLISHING AND MAINTAINING TRUST FOR SECURE COMMUNICATIONS

(71) Applicant: Applied Invention, LLC, Burbank, CA (US)

(72) Inventor: W. Daniel Hillis, Ridge, NH (US)

(73) Assignee: APPLIED INVENTION, LLC, Burbank, CA (US)

( * ) Notice: Subject to any disclaimer, the term of this patent is extended or adjusted under 35 U.S.C. 154(b) by 901 days.

(21) Appl. No.: 17/806,146

(22) Filed: Jun. 9, 2022

(65) Prior Publication Data

US 2022/0399999 A1 Dec. 15, 2022

Related U.S. Application Data

(60) Provisional application No. 63/209,047, filed on Jun. 10, 2021.

(51) Int. Cl.
| | |
|---|---|
| *H04L 9/08* | (2006.01) |
| *H04L 9/32* | (2006.01) |
| *H04L 9/40* | (2022.01) |
| *H04L 29/06* | (2006.01) |

(52) U.S. Cl.
CPC ............ *H04L 9/0825* (2013.01); *H04L 9/085* (2013.01); *H04L 9/3242* (2013.01); *H04L 63/20* (2013.01)

(58) Field of Classification Search
CPC ..... H04L 9/0825; H04L 9/085; H04L 9/3242; H04L 63/20; H04L 63/205; H04L 63/08; H04L 63/04; H04L 63/0428
See application file for complete search history.

(56) References Cited

U.S. PATENT DOCUMENTS

| | | | | |
|---|---|---|---|---|
| 2004/0015725 A1* | 1/2004 | Boneh | ................... | H04L 63/166 |
| | | | | 713/168 |
| 2011/0231555 A1* | 9/2011 | Ebrahimi | .............. | H04L 63/102 |
| | | | | 709/226 |
| 2017/0339130 A1* | 11/2017 | Reddy | ................. | H04L 63/0823 |

* cited by examiner

*Primary Examiner* — Edward Zee
(74) *Attorney, Agent, or Firm* — Perkins Coie LLP; Michael Glenn

(57) ABSTRACT

In a trust framework that enables secure communication, a configurer establishes an initial set of potential trusted relationships between a client and one or more anchors associated with one or more hosts. Once configured, the client can use a trusted relationship to securely communicate with a host without reliance on trusted third parties.

28 Claims, 4 Drawing Sheets

SYSTEM AND METHOD FOR ESTABLISHING AND MAINTAINING TRUST FOR SECURE COMMUNICATIONS

CROSS-REFERENCE TO RELATED APPLICATION(S)

This application claims priority to U.S. provisional patent application Ser. No. 63/209,047, filed 2021 Jun. 10, entitled "System and Method for Establishing Trust for Secure Communications", and is related to U.S. non-provisional patent application Ser. No. 17/091,944, filed 2020 Nov. 6, entitled "A Secure Communication System", each of which is incorporated herein in its entirety by this reference thereto.

TECHNICAL FIELD

The invention pertains to the field of communication networks and, in particular, systems for and methods of establishing and maintaining trust for secure communication between parties.

BACKGROUND

Establishing and maintaining trust is a fundamental challenge faced in the design and operation of a secure communication system. In particular, a communication system must assure that a client can reliably connect to and communicate with a host based on the name of the host. To do so, many existing communication systems require the client to place trust in third parties. For example, a client may need to rely upon a domain name system (DNS) to reliably convert a host name into a network address, and upon intermediate routers to reliably route traffic to the address provided by the DNS.

Finally, the communication system must assure the client that the party reached at that address is indeed the host. That is, the client must be able to trust that the host is the entity that is specified by the name.

To meet this last requirement, many existing systems, such as the widely adopted Transport Layer Security (TLS) and its predecessor Secure Sockets Layer (SSL), allow one party to authenticate its identity to the other using digital certificates within a public key infrastructure (PKI) grounded in asymmetric cryptographic techniques. Specifically, a digital certificate, issued by a certificate authority, allows a party named in the certificate to demonstrate that it is the certified owner of a public key. Once ownership of the public key has been demonstrated (i.e. a certificate has been presented and verified), another party (e.g. a client) may trust that subsequent communications, via connections secured by the public key and corresponding private key, originated from the certified party (e.g. a host).

The effectiveness of such an approach depends upon the certificate authority. As in the case of the DNS and routers, the certificate authority is often a trusted third party. Of course, a certificate authority compromised by an adversary results in a complete loss of trust in any certificates issued by the authority subsequent to the compromise. Fortunately, such incidents are rare, but they have occurred. Less nefarious opportunities for compromised security also exist, especially in those cases where the certificate authority endeavors to verify that the 'real-world' identity of the certificate recipient matches the named identity of the certificate. Even an honest and uncompromised certificate authority may have difficulty reliably ascertaining the real-world identity of a party requesting a certificate. Moreover, in practice, the thoroughness and reliability of such verification measures vary significantly.

It would thus be advantageous to provide a system for and a method of establishing and maintaining trust in a secure communication system that do not rely upon third parties. Especially, it would be advantageous to assure a client, without reliance on a third party such as a certificate authority, that the identity of a host with which it is communicating matches the name of the host. Because such a client would normally rely on the integrity of its software configuration, this could be accomplished by storing within the configuration a public key for each potential host in association with the host's name. The host could then prove its identity by demonstrating that it has access to the private key corresponding to that public key. Such an approach, however, has two significant disadvantages. First, it requires a large amount of storage for the public keys of every potential host. Second, it makes no provision for the host changing its key or its encryption algorithm after the client is configured. It would thus be advantageous to provide a system for and a method of establishing and maintaining trust in a secure communication system that use relatively little storage and provide a mechanism for the host to change its key or its encryption algorithm.

BRIEF DESCRIPTION OF THE DRAWINGS

The foregoing aspects are better understood from the following detailed description of the invention with reference to the drawings, in which.

DETAILED DESCRIPTION

Overview

Embodiments of the invention provide a trust framework that enables secure communication in which a configurer establishes an initial set of potential trusted relationships between a client and one or more anchors associated with one or more hosts. Once configured, the client can use a trusted relationship to securely communicate with a host without reliance on trusted third parties.

More specifically, the trust framework facilitates a direct and durable identity relationship between an anchor and an anchored client, termed a sustained bond. Much as a secure communication session establishes a relationship between the communicating parties at the beginning of the session and maintains it through the continuity of the session, a sustained bond establishes an identity relationship that is maintained through subsequent interaction between the parties. In the case of a sustained bond, however, the communicating parties are not required to be in continuous communication and the client is not required to continuously store secret information to maintain the identity relationship. Clients may also use the initial set of sustained bonds established by the configurer to establish new sustained bonds without reliance on a trusted third party.

The information required for defining and maintaining each sustained bond is stored within the client and is called the sustained bond state. Each sustained bond state includes a hash code that allows the client to establish a secure connection with a host associated with a particular anchor. Specifically, the client can apply a cryptographic hash function to a public key presented by the anchor and compare the resulting hash code to the hash code in the sustained bond state.

Figure 1:
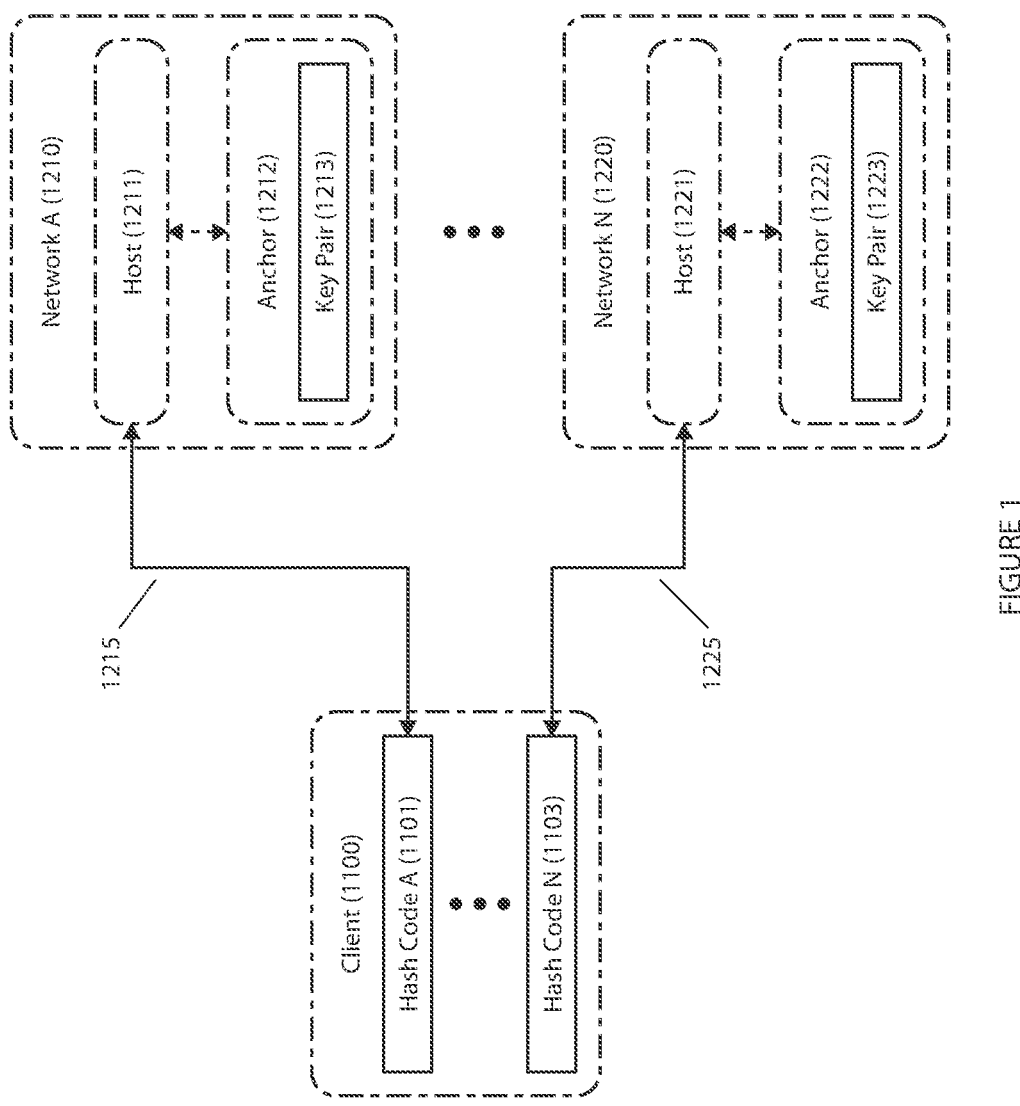
FIG. 1 shows a schematic representation of a client using sustained bonds to securely communicate with several hosts according to an embodiment of the invention.

FIG. 1 shows a schematic representation of a client using sustained bonds to securely communicate with several hosts according to an embodiment of the invention. The client 1100 establishes a secure connection 1215 with a host 1211 within network A 1210 by verifying the public key, within a key pair 1213, presented by an anchor 1212 associated with the host. To verify the public key, it applies a cryptographic hash function to the public key and compares the resulting hash code to a stored hash code A 1101. Additional sustained bonds allow the client to establish secure connections with hosts associated with other anchors. For example, the client can establish a secure connection 1225 with a host 1221 on network N 1220. To do so, it similarly verifies a public key, within a key pair 1223, presented by an anchor 1222 associated with the host. To verify the public key, it applies a cryptographic hash function to the public key and compares the resulting hash code to a stored hash code N 1103.

In some embodiments of the invention, a host and its associated anchor are implemented together, such that the host is also its own associated anchor. However, other embodiments of the invention (described in greater detail below) implement anchors associated with multiple hosts in a distributed fashion. In either case, each host has a secure channel of communication with its associated anchor.

By separating identity verification from an initial distribution of public keys, the sustained bond eliminates the need for a trusted third party (e.g. a certificate authority) to distribute and certify keys as in a conventional Public Key Infrastructure (PKI). Anchors can generate a public/private key pair and announce the public keys to potential clients, and appropriately configured clients can use the announced public key to verify the identity of the anchor (and by extension the associated host) and securely communicate with the host.

Sustained Bond State

Figure 2:
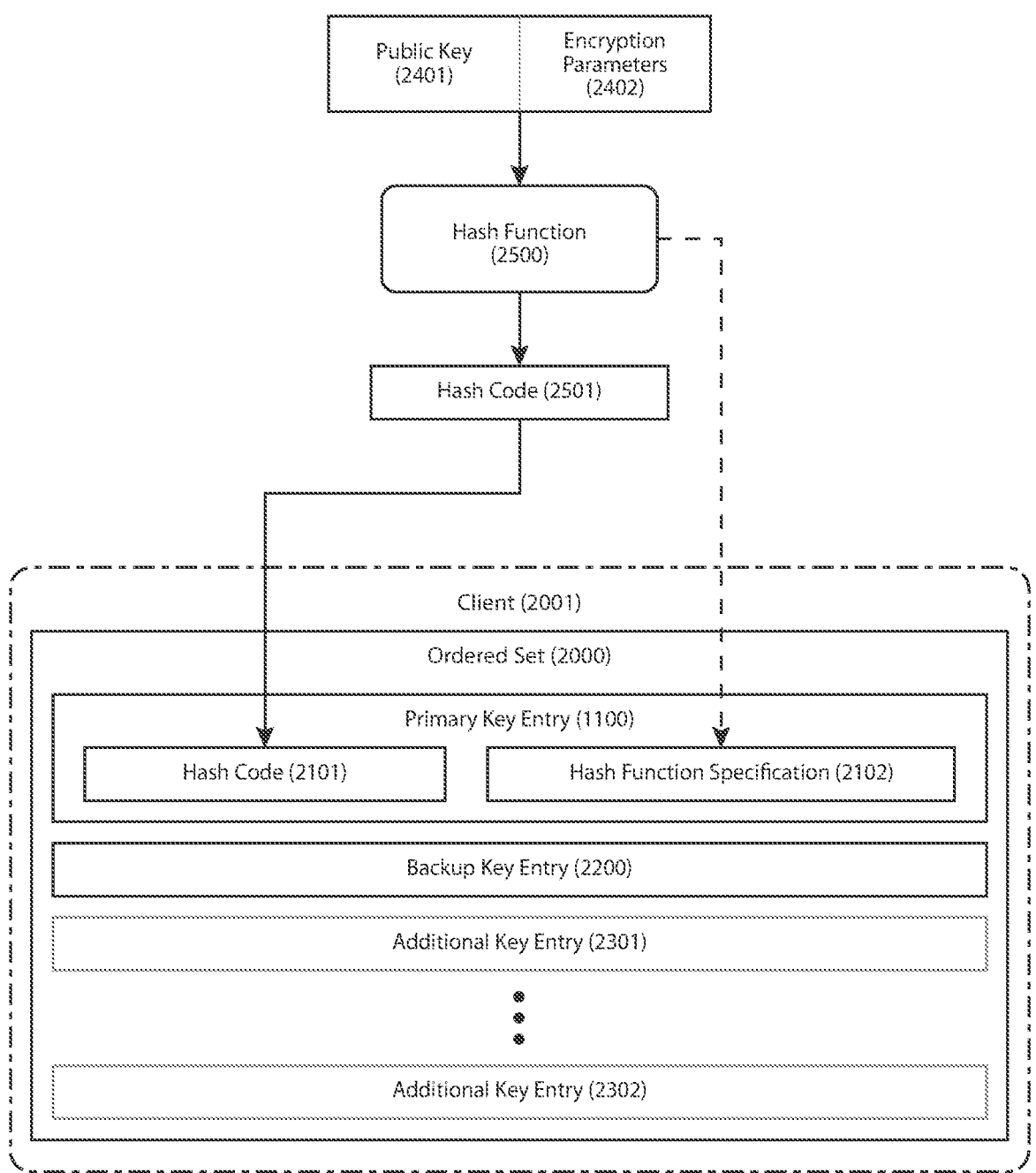
FIG. 2 shows a schematic representation of an ordered set of key entries stored by a client in a sustained bond state according to an embodiment of the invention.

In the preferred embodiments, as illustrated in FIG. 2, the hash codes within the sustained bond state are stored within an ordered set of key entries. Each key entry includes a hash code 2501 generated by hashing a public key 2401 and associated encryption parameters 2402 (e.g. hashing a concatenation of the public key and the encryption parameters). The encryption parameters include a specification of an encryption algorithm and any arguments required by the encryption algorithm. Each key entry also includes a specification of the cryptographic hash function 2500 used to generate the hash code within the key entry. Different hash functions may be used for different key entries.

In one embodiment of the invention, the ordered set of key entries 2000 stored by the client 2001 contains a primary key entry 2100 and backup key entry 2200. Each contains a hash code and a hash function specification. For example, the primary key entry contains a hash code 2101 and hash function specification 2102. In another embodiment of the invention, the ordered set of key entries is a longer ordered list of key entries, in which case the ordered set of key entries also includes one or more additional key entries 2301 and 2302.

The sustained bond state may also include the public key currently being used by the anchor and its associated encryption parameters. The sustained bond state may also include a shared secret established with the anchor.

Initial Configuration of Sustained Bonds

As mentioned above, a configurer configures a client with an initial set of sustained bonds the client needs for its initial secure communication with hosts. The configurer also provides the client with sustained bonds with extension anchors that allow the client to establish new sustained bonds.

Preferably, the initial sustained bond state does not include a shared secret. Instead, it merely includes the ordered set of key entries. A client and anchor can use this information to establish shared secrets. The ordered set of key entries is long enough to incorporate public keys valid (in the face of possible public key expirations or retirements) at least until the client will have an opportunity to establish an initial secure connection with a host and, in coordination with the associated anchor, establish a shared secret for the sustained bond.

The ordered set of key entries for an anchor is public information. Its initial validity is confirmed by its inclusion in the initial configuration by the configurer. The client must therefore trust the configurer. For a personally-owned device, the configurer may be a manufacturer or vendor from which the device is purchased. For enterprise-managed devices, the configurer may be the enterprise's device configuration process. In either case, the safe and secure operation of the client already depends on trust of the configurer. Thus, the required reliance on the configurer to establish the initial sustained bond state does not require that the client trust an additional third party beyond those parties tasked with the design and deployment of the secure communication system itself.

As noted above, because a client must trust the configurer in this manner, it would be possible for the configurer to establish the initial set of trusted relationships using conventional self-signed certificates. However, the amount of information associated with such a certificate is substantially greater than the (relatively compact) hash codes. The trust framework described herein is thus more storage-efficient than an approach based on self-signed certificates, which is advantageous in systems where clients may need to be configured with numerous trusted relationships.

Establishing a Secure Connection Using a Shared Secret

Figure 4:
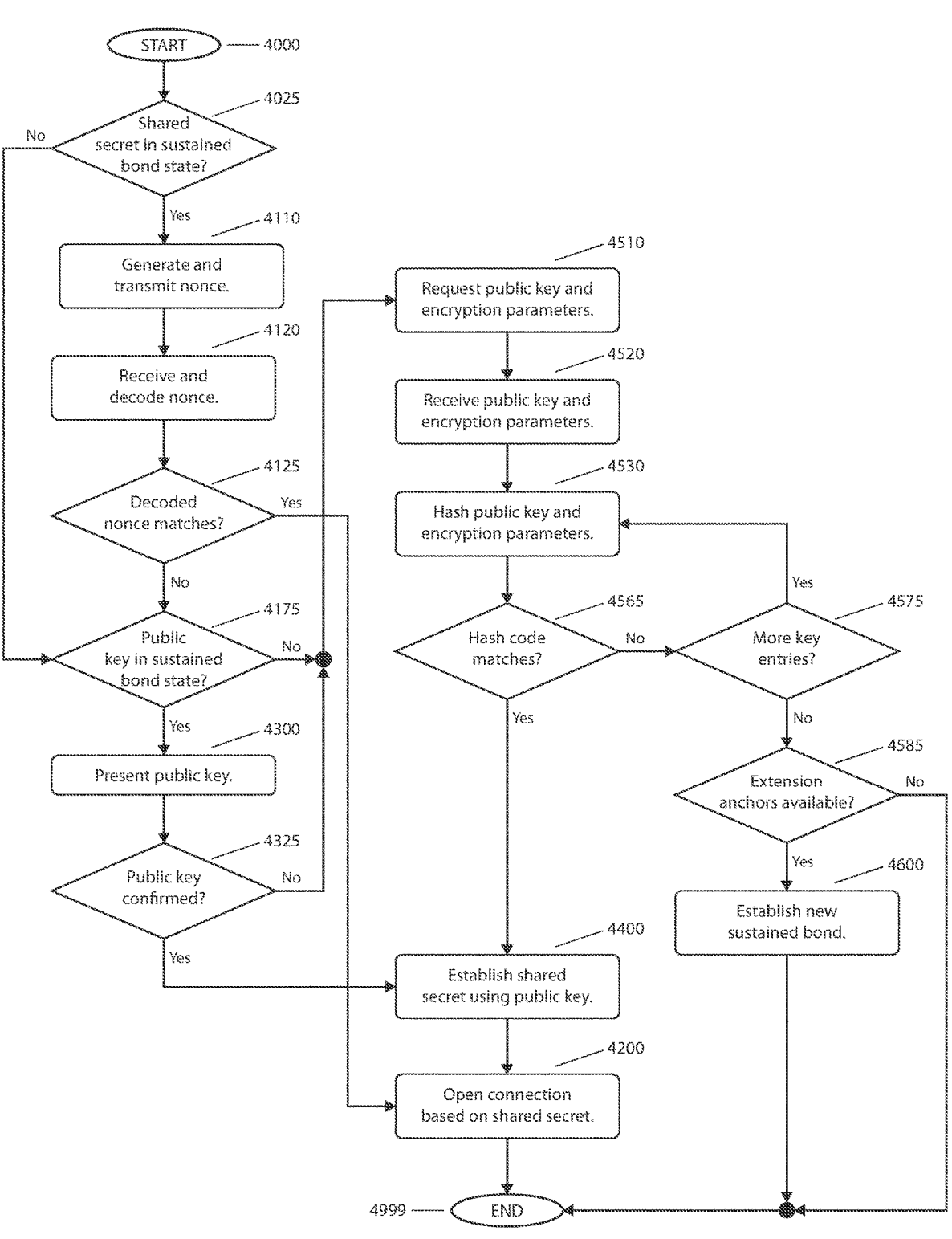
FIG. 4 shows a flow chart summarizing a process for establishing a secure connection between a client and a host according to an embodiment of the invention.

FIG. 4 shows a flow chart summarizing a process for establishing a secure connection between a client and a host according to an embodiment of the invention. The simplest and preferred method for an anchored client to establish a secure connection is using a shared secret. If 4025 a shared secret is present in the sustained bond state, the anchored client may use it to verify the identity of the anchor upon establishing a secure connection with a host associated with the anchor. Specifically, the anchored client generates and transmits 4110 a nonce to the anchor via the host's secure channel of communication with the anchor. The anchor encodes the nonce with the shared secret and returns the encoded nonce via the host. The anchored client receives and decodes 4120 the encoded nonce with the shared secret to confirm that it decodes to the nonce. For example, the anchor may encrypt the nonce using a symmetric encryption algorithm and a shared secret key and return the resulting cipher text for decryption by the anchored client. Successful decoding of the encoded nonce demonstrates to the anchored client that the anchor has access to the shared secret, and the transmission of this information through the secure channel, from anchor to host, verifies that the host has secure access to the anchor. Thus, if 4125 the decoded nonce matches, the client and host can open 4200 the secure connection based on the shared secret, and the process of establishing a secure connection ends 4999. If 4125 the decoded nonce does not match, then either the anchor or host is an imposter or the shared secret is no longer shared, in which case the anchored client must establish a secure connection with the host using one of the methods described below.

Establishing a Secure Connection Using a Current Public Key

As noted above, the sustained bond state of the anchored client may include a public key that the anchored client believes to be the public key currently in use by the anchor. If 4025 a shared secret is not present in the sustained bond state or if an anchored client is unsuccessful in establishing a secure connection using a shared secret (i.e. the decoded nonce did not 4125 match), and if 4175 a public key is present in the sustained bond state, the client may attempt to use the public key to establish a new shared secret. Specifically, the anchored client presents 4300 the presumed public key to the anchor via the host. If 4325 the presented public key is indeed the public key currently in use by the anchor, the anchored client and anchor can establish 4400 a new shared secret using the public key. Specifically, the anchor transmits a new shared secret to the anchored client, via the host, encrypted by the corresponding private key. The anchored client then decrypts the shared secret using the public key and adds the shared secret to the sustained bond state. The anchored client and the host can then open 4200 a secure connection based on the shared secret, and the process of establishing a secure connection ends 4999. If the public key presented by the client is not the public key currently in use by the anchor, the anchored client must establish a secure connection with the host using one of the methods described below.

Establishing a Secure Connection Using Key Entries

If an anchored client cannot establish a secure connection using a shared secret or using a current public key, it may attempt to do so using the ordered set of key entries in the sustained bond state. This may be necessary if 4025 there is no shared secret present in the sustained bond state and 4175 there is no public key present in the sustained bond state. The scenario occurs, most obviously, when an anchored client first attempts to establish a secure connection with a host associated with a particular anchor. It may also be necessary if 4025 there is no shared secret present in the sustained bond state and 4325 the public key present in the sustained bond state is not confirmed by the anchor. Finally, it may be necessary if 4025 there is a shared secret present in the sustained bond state, but 4125 the shared secret cannot be confirmed (i.e. the decoded nonce did not match) and either 4175 there is no public key present in the sustained bond state or 4325 the public key present in the sustained bond state is not confirmed by the anchor.

To establish a secure connection using key entries, the anchored client requests 4510 that the anchor present a public key and encryption parameters via the host. The anchored client then receives 4520 a public key and encryption parameters, hashes the presented public key and encryption parameters with the hash function specified in each key entry in the ordered set of key entries, and compares the resulting hash code against the hash code stored in the key entry. Preferably, to reduce the computation required, the anchored client hashes and compares sequentially. For example, in the preferred embodiment of FIG. 4, the anchored client hashes 4530 the presented public key and encryption parameters with the hash function specified in the primary key entry and compares the resulting hash code to the hash code of the primary key entry. If 4565 the hash code does not match, and 4575 more key entries (e.g. the backup key entry) are available in the ordered set of key entries, the anchored client hashes the presented public key and encryption parameters with the hash function specified in the next key entry and compares the resulting hash code to the hash code stored in the next key entry. If 4565 the anchored client is able to match the resulting hash code against a hash code in the ordered set of key entries, the anchored client can verify that the presented public key originated from the anchor (i.e. the anchor is not an imposter). The anchored client and anchor may then use the verified public key to establish 4400 a shared secret for the sustained bond. If 4565 the anchored client is not able to match the hash code resulting from the presented public key and encryption parameters, and 4575 there are no more key entries available in the ordered set of key entries, then either the anchor is an imposter or the sustained bond has been lost. In this case, if 4585 extension anchors are not available, the process of establishing a secure connection ends 4999. If 4585 extension anchors are available, the anchored client can establish 4600 a new sustained bond as described below, but the current process of establishing a secure connection ends 4999.

Updating Shared Secrets and Public Keys

The anchored client and anchor may use a sequence of shared secrets to maintain their trusted relationship. The shared secret may be changed by the anchor as frequently as it deems necessary. For example, the anchor may change the shared secret if it has become stale through its use as a symmetric key. The new shared secret may be communicated under the encryption of the current shared secret. But should the chain of shared secrets be lost, the anchor may use a public key to re-establish a shared secret as described above.

Since a sustained bond is intended to persist over a long period of time, the anchor may wish to update the public keys hashed within the ordered set of key entries associated with the sustained bond. It may also wish to adopt new encryption algorithms if those specified in the encryption parameters of the current key entries are in danger of becoming obsolete or vulnerable to attack.

Figure 3:
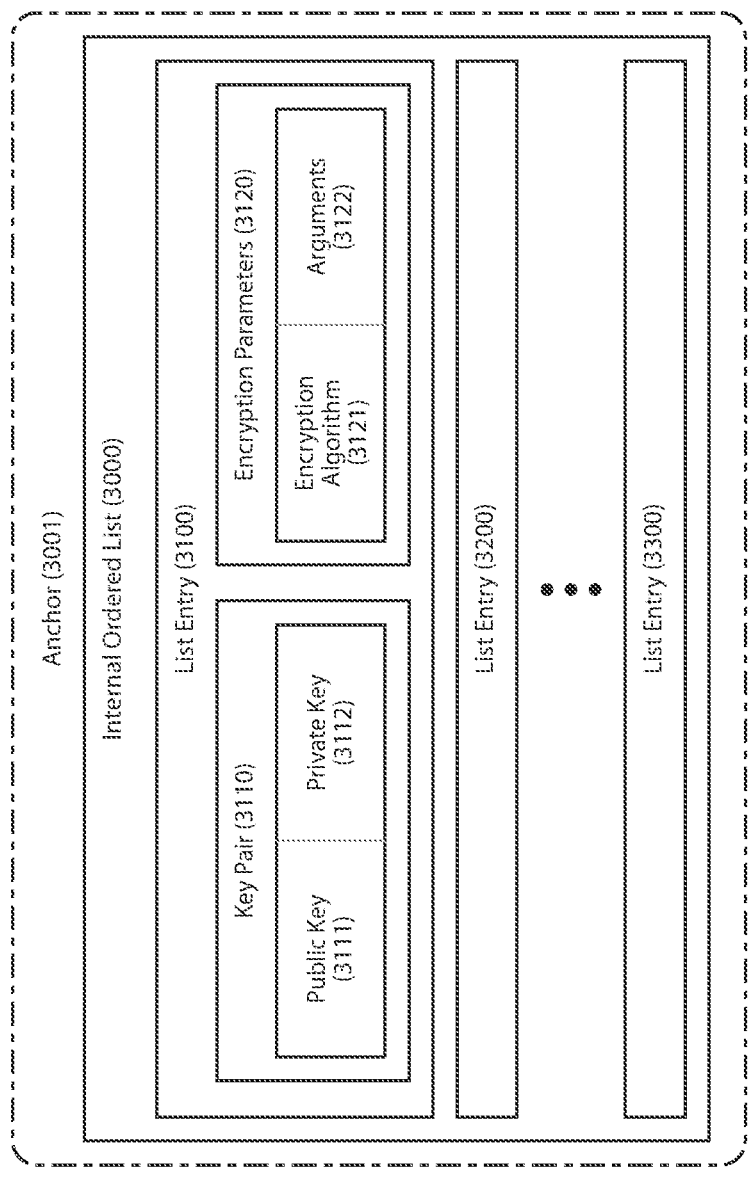
FIG. 3 shows a schematic representation of an internal ordered list of public/private key pairs stored by an anchor according to an embodiment of the invention.

To accommodate such updates, as illustrated in FIG. 3, each anchor 3001 maintains an internal ordered list 3000 of public/private key pairs that it plans to use in the foreseeable future. Each list entry 3100, 3200, and 3300 includes a key pair 3110 and associated encryption parameters 3120. Each key pair includes a public key 3111 and a private key 3112. The encryption parameters specify an encryption algorithm 3121 and any arguments 3122 required by the encryption algorithm. Although an anchor keeps a separate shared secret for each sustained bond, it keeps only a single internal ordered list of public/private key pairs and associated encryption parameters. Each time an anchor wishes to update its public key, it (a) retrieves the public key from the key pair at the head of the internal ordered list, (b) creates an additional key pair using an encryption algorithm (and required arguments), and (c) adds a corresponding list entry to the tail of the internal ordered list.

Upon adding a list entry, the anchor applies a cryptographic hash function to the public key and the associated encryption parameters. It shares the resulting hash code and a specification of the cryptographic hash function with each anchored client so that the anchored client can add the hash code and specification of the cryptographic hash function to the ordered set of key entries within its sustained bond state.

If an anchor changes public keys while an anchored client is not actively connected to an associated host via a secure connection, the anchored client will recognize the change of keys when it next establishes a secure connection using key entries. Specifically, the anchored client will recognize the change of key when it attempts to verify the public key and encryption parameters presented by the anchor against the hash code at the head of its ordered set of key entries. In this case, as noted above, the anchored client will attempt to verify the presented public key and encryption parameters against the other hash codes in the ordered set of key entries. If the anchored client successfully verifies the presented public key, it places the corresponding key entry at the head of the ordered set of key entries. The anchored client may then cease to store the key entries associated with all earlier public keys (i.e. all public keys now retired from the anchor's internal ordered list). Especially in those embodiments where an anchored client stores a longer ordered list of key entries, the anchored client may also request that the anchor provide an equivalent number of new hash codes and encryption parameters for addition to the tail of the ordered set.

The anchored client is always the initiator of any secure connection. Whenever a secure connection is currently established, the anchor may use it to share any new hash codes and encryption parameters required to keep the anchored client's sustained bond state current (i.e. consistent with the anchor's internal ordered list). Alternatively, or in addition, an anchored client may proactively request such updates upon re-establishing a secure connection as described above. In either case, to maintain a sustained bond, an anchored client must re-establish a secure connection within a required check-in interval of the last secure connection. If the anchored client fails to re-establish a secure connection within the required check-in interval, it may lose the sustained bond.

The required check-in interval is determined based on the length of the ordered set of key entries stored in the sustained bond state and the maximum frequency with which the anchor may be expected to change public keys. Each anchored client determines the length of the ordered set it stores by balancing the cost of the higher storage requirements against the benefits of a longer required check-in interval. Different anchored clients may make this tradeoff differently, depending on factors such as the available storage, the expected frequency of contact with the anchor, and the difficulty of establishing a secure connection versus establishing a new sustained bond (as described below).

In any case, an upper bound on the required check-in interval is imposed by the number of future public keys the anchor is willing to announce. Since extension anchors serve as a backup system for establishing new sustained bonds to replace lost sustained bonds (as described below), anchored clients preferably maintain as long an ordered set of key entries for each extension anchor as the extension anchor is willing to announce.

Establishing a New Sustained Bond

New sustained bonds are established rarely, for example when a sustained bond is lost or when a client desires to connect to a host associated with an anchor for which no sustained bond was included in the client's initial configuration. A new sustained bond is established through existing sustained bonds with extension anchors that themselves have sustained bonds with the desired anchors.

An extension anchor assists in establishing a new sustained bond between an anchored client and a desired anchor by sharing its ordered set of hash codes and hash function specifications (i.e. key entries) for the desired anchor with the anchored client. While this information is not secret, the extension anchor endorses the information by sharing it with the anchored client under the encryption of the shared secret of its sustained bond with the client.

Preferably, to protect against the compromise of any single extension anchor, any new sustained bond must be established through j independent extension anchors. If the anchored client receives the same hash codes and encryption parameters from j different anchors, it accepts the information as genuine and uses it to establish a trusted relationship with the desired anchor via a new sustained bond.

Since the extension anchors exchange only public information, they can be operated by third parties that are not necessarily trusted. Any extension anchor providing misinformation will be quickly noticed, and a successful attack of such a system would require the simultaneous compromise at least j of the extension anchors prior to detection. Of course, obtaining consensus from j different extension anchors is a relatively time-consuming operation for a client. But as noted, the consensus procedure is used only on those rare occasions where additional sustained bonds must be established.

Distributed Anchors

As noted above, in some embodiments of the invention, each host is a distinct entity with which the client may wish to securely communicate. In this case, a distinct anchor may be implemented by and associated with each host, and there is a one-to-one relationship between anchor and host.

However, other embodiments of the invention may implement anchors in a distributed fashion. In one such embodiment, an anchor service is implemented across several anchor servers that are contacted by hosts serving as gateways to a secure communication network. Preferably, the connections between the hosts and anchor servers are themselves secure connections based on trusted relationships. In such a case, for ease of implementation, more than one host can utilize the same anchor service implemented across the same set of anchor servers. From the perspective of the client, a secure connection into the secure communication network may be established via any one of the hosts, using the same sustained bond with the single distributed anchor.

Preferably, the anchor service is operated in a manner that guards against the potential compromise of a single anchor server. Specifically, compromise of a single anchor server must not reveal the anchor's shared secrets. For this reason, the shared secret for a sustained bond with a distributed anchor is preferably a vector of n secret elements, each of which is shared with and held by a different anchor server. The encoded nonces returned to the anchored client by a host when the anchored client attempts to establish a secure connection are vectors of n encodings of the nonce, each independently encoded by a server using its own secret element. An anchored client verifies the anchor if and only if k of the n encoded elements correctly decode to the nonce. Preferably, k>1.

In some embodiments of the invention, each anchor server maintains its own internal ordered list of public/private key pairs and associated encryption parameters. Accordingly, the sustained bond state maintained by the anchored client must include an ordered set of key entries for each of the n servers. Accordingly, an anchored client establishing a secure connection using key entries will be presented with a vector of n public keys and encryption parameters. The anchored client will verify the anchor if and only if at least k of the n public keys and encryption parameters can be verified against their respective key entries. The anchored client can use the verified public keys to establish distinct shared secrets with each of the corresponding anchor servers.

Summary of Sustained Bonds

A sustained bond between a client and an anchor is initially established based on a configuration defined by a configurer that configures the client. Once established, the sustained bond is maintained by a series of three different mechanisms, each more computationally expensive and more rarely used than the last.

1. The update of a shared secret under the current shared secret.
2. The establishment of a new shared secret following public key verification.
3. Updates to an ordered set of verifiable public keys and associated encryption parameters.

These mechanisms provide a robust continuity through which the sustained bond can be maintained over the long term. Nonetheless, if that continuity is lost, it may be re-established by new sustained bonds established via extension anchors.

Exemplary Embodiment of the Invention

An example of a secure communication system that may implement the trust framework is described in the above referenced application entitled "A Secure Communication System".

The referenced application describes a secure communication system, called the selective network system (SNS), based on a secure network, called the selective node network (SNN). The SNS consists of the SNN, agents, adaptors, a method of agent-adaptor communication for each agent, and a method of adaptor-SNN communication for each adaptor. Agents may be, for example, people, devices, software services, networks, or combinations of these, such as a person using a device. Agents connect to the SNN via adaptors that facilitate the authentication of the agents by the SNN and transmit and receive the agent's communications through the SNN. Each of the agents has an identity and access to a set of credentials that can be used to authenticate attributes of that identity.

An SNS makes use of secure channels, which transmit information between two endpoints in a manner resistant to eavesdropping and tampering. A secure channel may be implemented by a protected, hardwired, electrical or optical connection; by an internal hardware connection such as a data bus, register, or shared memory; or by a secure communications session established through a network. A secure channel may also be reliable, in the sense that it is protected against internal loss or corruption of the transmitted information. A reliable, secure channel is either implemented on an internal hardware connection within a hardware unit or through a connection between hardware units that can detect and retransmit lost or corrupted information.

Agents communicate with the SNN through reliable, secure channels called tie-ins. Each agent communicates with the SNN through an adaptor that associates the agent's communications with an authenticated identity. Allowed communication packets travel from a source agent to its adaptor; through a tie-in to the SNN; back through a tie-in to another adaptor; and finally, to a destination agent.

The SNN comprises of a set of packet processing units (PPUs), a plurality of SNN services, and an internal communication system that allows the services to communicate with the PPUs and the PPUs to communicate with one another. Some PPUs, called docks, can establish tie-ins with adaptors that allow agents to communicate through and within the SNN. Some docks are gateways to the SNN, and other docks are internal docks that allow internal services to communicate through the SNN as agents. The internal services each have an internal adaptor and can communicate with an internal dock. Every dock can communicate with its connected adaptors. Other PPUs, called forwarders, connect only to other PPUs. Each dock is connected directly by a link to one forwarder.

Among the SNN services is an admin service that manages configurations of the SNN and manages other SNN services. The admin service is connected by a reliable, secure channel to each PPU to at least one agent serving as an admin.

The SNS may implement the trust framework using an anchor service implemented as a SNN service under the management of the admin service. Sustained bonds are configured and established between agents, which function as the clients described above, and docks, which function as the hosts described above. An agent must have a sustained bond with the anchor service of the SNN to establish a tie-in with a dock of the SNN. The tie-in functions as the secure connection described above. Sustained bonds thus persist across the establishment and disestablishment of tie-ins, maintaining a sense of continuity between agent and dock over the long term.

The invention claimed is:

1. A computer implemented system for establishing and maintaining trust in a secure communication system comprising:
   a client,
   a host,
   an anchor associated with said host, and
   a sustained bond state, stored by said client,
   wherein said host has a secure channel of communication with said anchor, and
   wherein said sustained bond state provides a trusted identity relationship with said anchor enabling said client to establish a secure connection with said host,
   wherein said sustained bond state comprises a shared secret shared by said client and said anchor,
   wherein said client uses said shared secret to verify an identity of said anchor upon establishing said secure connection, and
   wherein said client verifies said identity of said anchor by transmitting a nonce to said anchor, encoding said nonce with said shared secret, and comparing said encoded nonce with an encoded nonce received from said anchor.

2. The system of claim 1, wherein said anchor is associated with said host in a one-to-one relationship.

3. The system of claim 1, wherein said anchor is associated with multiple hosts within said secure communication system.

4. The system of claim 1, wherein said anchor is implemented in a distributed fashion.

5. The system of claim 1, wherein said client and said host open said secure connection based on said shared secret.

6. The system of claim 1, wherein said sustained bond state comprises a public key currently in use by said anchor.

7. The system of claim 6, wherein said client and said anchor use said public key to establish a shared secret and open said secure connection based on said shared secret.

8. The system of claim 1, wherein said sustained bond state is provided to said client by a configurer.

9. The system of claim 8, wherein said configurer comprises any of:

a manufacturer of a device on which said client resides, a vendor of the device on which said client resides, and a configuration process operated by an enterprise that manages the device on which said client resides.

10. A computer implemented system for establishing and maintaining trust in a secure communication system comprising:

a client, a host, an anchor associated with said host, and a sustained bond state, stored by said client, wherein said host has a secure channel of communication with said anchor, and wherein said sustained bond state provides a trusted identity relationship with said anchor enabling said client to establish a secure connection with said host;

wherein said sustained bond state comprises a hash code, wherein said hash code is stored within a key entry within said sustained bond state comprising said hash code and a specification of the hash function used to generate said hash code.

11. The system of claim 10, wherein said client receives a candidate public key and associated candidate encryption parameters from said anchor, hashes said candidate public key and associated candidate encryption parameters using said hash function, and compares the resulting hash code with said hash code.

12. The system of claim 11, wherein if said resulting hash code matches said hash code, said client and said anchor use said candidate public key to establish a shared secret and open said secure connection based on said shared secret.

13. The system of claim 10, wherein said anchor stores a list of key pairs.

14. The system of claim 13, wherein said key entry is within a set of key entries and, upon or after establishing a secure connection with said anchor, said client updates said set of key entries based on said list of key pairs.

15. A computer implemented system for establishing and maintaining trust in a secure communication system comprising:

a client, a host, an anchor associated with said host, and a sustained bond state, stored by said client, wherein said host has a secure channel of communication with said anchor, and wherein said sustained bond state provides a trusted identity relationship with said anchor enabling said client to establish a secure connection with said host, wherein said client establishes a new sustained bond with a new anchor via a sustained bond between said anchor and said new anchor, wherein said client establishes said new sustained bond by receiving one or more hash codes and hash function specifications from said anchor and storing them within a new sustained bond state.

16. A method for establishing and maintaining trust in a secure communication system comprising:

associating an anchor with a host, establishing a secure channel of communication between said host and said anchor, storing, by a client, a sustained bond state that provides a trusted identity relationship between said client and said anchor, and said client using said trusted identity relationship to establish a secure connection with said host, wherein said sustained bond state comprises a hash code, wherein said hash code is stored within a key entry within said sustained bond state comprising said hash code and a specification of the hash function used to generate said hash code.

17. The method of claim 16, wherein said sustained bond state comprises a shared secret shared by said client and said anchor.

18. The method of claim 17, wherein said client uses said shared secret to verify an identity of said anchor upon establishing said secure connection.

19. The method of claim 17, wherein said client and said host open said secure connection based on said shared secret.

20. The method of claim 16, wherein said sustained bond state comprises a public key currently in use by said anchor.

21. The method of claim 20, wherein said client and said anchor use said public key to establish a shared secret and open said secure connection based on said shared secret.

22. The method of claim 16, wherein said hash code is generated by applying a cryptographic hash function to a public key associated with said anchor and encryption parameters associated with said public key.

23. The method of claim 16, wherein said client receives a candidate public key and associated candidate encryption parameters from said anchor, hashes said candidate public key and associated candidate encryption parameters using said hash function, and compares the resulting hash code with said hash code.

24. The method of claim 23, wherein if said resulting hash code matches said hash code, said client and said anchor use said candidate public key to establish a shared secret and open said secure connection based on said shared secret.

25. The method of claim 16, wherein said client establishes a new sustained bond with a new anchor via a sustained bond between said anchor and said new anchor.

26. The method of claim 25, wherein said client establishes said new sustained bond by receiving one or more hash codes and hash function specifications from said anchor and storing them within a new sustained bond state.

27. The method of claim 16, wherein said sustained bond state is provided to said client by a configurer.

28. The method of claim 27, wherein said configurer comprises any of:

a manufacturer of a device on which said client resides, a vendor of the device on which said client resides, and a configuration process operated by an enterprise that manages the device on which said client resides.

* * * * *